US007254382B2

(12) United States Patent
Hasan et al.

(10) Patent No.: US 7,254,382 B2
(45) Date of Patent: Aug. 7, 2007

(54) TOLL PAYMENT SERVICE VIA WIRELESS COMMUNICATION NETWORKS

(75) Inventors: Peggy Hasan, Aurora, IL (US); Sandra Lynn True, St. Charles, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 585 days.

(21) Appl. No.: 10/758,358

(22) Filed: Jan. 15, 2004

(65) Prior Publication Data

US 2005/0159133 A1 Jul. 21, 2005

(51) Int. Cl.
   *H04M 11/00* (2006.01)
(52) U.S. Cl. .................... 455/406; 455/407; 455/456.1
(58) Field of Classification Search ................ 455/406, 455/407, 456.1, 456.2, 456.3, 517, 524, 525; 340/928, 539; 705/13
   See application file for complete search history.

(56) References Cited

U.S. PATENT DOCUMENTS 6,529,727 B1 * 3/2003 Findikli et al. ............. 455/411

2002/0067291 A1 * 6/2002 Ikeda ......................... 340/928
2002/0198767 A1 * 12/2002 Kim ............................. 705/13

* cited by examiner

*Primary Examiner*—Melur Ramakrishnaiah

(57) ABSTRACT

A method of processing toll payments for a motorist having a wireless communications device and a billing account, via a wireless communications network. The method includes sensing that the motorist is within range of a base station for a toll plaza having a given toll that is to be paid by the motorist; determining via a mobile switching center whether the motorist has activated a wireless toll payment service associated with the communication device; evaluating via the mobile switching center whether the subscriber has pre-selected a combined billing option for the account, where it has been determined that the service has been activated by the subscriber; sending a charge transaction from the mobile switching center to a toll payment system, where the motorist has not selected the combined billing option, the charge transaction indicating that the toll has not been paid by the motorist; and generating a billing record for the motorist at the mobile switching center and sending a non-charge transaction from the mobile switching center to a toll payment system, where the motorist has selected the combined billing option, the non-charge transaction indicating that the toll has been billed to the motorist by his/her wireless service provider.

10 Claims, 4 Drawing Sheets

TOLL PAYMENT SERVICE VIA WIRELESS COMMUNICATION NETWORKS

FIELD OF THE INVENTION

The present invention relates to the art of telecommunications in general, and, more particularly, to a method and system for paying highway tolls via wireless communication networks and devices.

BACKGROUND OF THE INVENTION

Electronic toll collection systems for tollways are well known. One such system is I-PASS, which is the Illinois Tollway's Electronic Toll Collection Program. With I-PASS, users of the Illinois Tollway may open an account that allows for travel through the toll plazas faster, often without stopping, and no cash toll payments.

Typically, I-PASS users pay a refundable security deposit for the use of the equipment and then prepay their tolls into an account. As the user drives through the toll collection lanes, the individual toll at that location is electronically deducted from their prepaid toll balance. Motorists, who choose, may also sign up for automatic replenishment by credit card so that when their account balance falls below a certain minimum, replenishment is credited to their account. However, this process may take up to twenty-four hours.

A user may open an I-PASS account with a credit card or check. The account is typically set up as a prepaid debit account wherein the user must maintain a positive balance in the account at all times. Once an account is opened, the user is issued a small device called a "transponder." This transponder communicates through radio signals with the toll plazas as the user drives through the toll plazas. Account information is sent back and forth between the transponder and the plaza, and the user's prepaid toll balance is debited. The transponder generally mounts to the vehicle's windshield, right behind the rearview mirror. It may be mounted on dualock (Velcro-like) strips and is generally removable so that it can be moved from car to car.

There is no interaction between the user and the transponder; all functionality happens electronically. When approaching a toll plaza, the user can use any toll collection lane, including the I-PASS dedicated lanes. In most cases, as the user drives through the lanes, a blue light will be activated. This means the user's I-PASS transaction has been successfully completed. A yellow light may also be activated, indicating that the user's account balance has fallen below the minimum amount and that steps will need to be taken to immediately replenish the account.

However, there are some drawbacks to such services. For instance, the sign-up process may be too slow for some people, and it does require users to pick up a separate device (the transponder) for their car in person or wait for it to be shipped to their home or office. Thus, a delay results in many cases between the decision to subscribe to the service and activation of the service for use.

Thus, there is a need for a fast and convenient method for subscribing to, activating, and paying tolls via wireless communication networks and devices. Wireless communication networks are well known and allow mobile devices to communicate with each other and other networks, including the Internet and the public switched telephone network.

SUMMARY OF THE INVENTION

In accordance with one aspect of the present invention, a method of processing toll payments for a motorist having a wireless communication device and a billing account with a wireless service provider, via a wireless communication network, is provided. The method includes sensing that the motorist is within range of a base station for a toll plaza having a given toll that is to be paid by the motorist; determining via a mobile switching center whether the motorist has activated a wireless toll payment service associated with the communication device; evaluating via the mobile switching center whether the subscriber has pre-selected a combined billing option for the account, where it has been determined that the service has been activated by the subscriber; sending a charge transaction from the mobile switching center to a toll payment system, where the motorist has not selected the combined billing option, the charge transaction indicating that the toll has not been paid by the motorist; and generating a billing record for the motorist at the mobile switching center and sending a non-charge transaction from the mobile switching center to a toll payment system, where the motorist has selected the combined billing option, the non-charge transaction indicating that the toll has been billed to the motorist via the wireless service provider of the motorist.

In accordance with another aspect of the present invention, a system for processing toll payments for a motorist having a wireless communication device and a wireless billing account with a wireless service provider is provided. The system includes means for sensing that the motorist having a communication device is within range of a base station for a toll plaza having a given toll that is to be paid by the motorist; means for determining at a mobile switching center whether the motorist has activated a wireless toll payment service associated with the communication device; means for evaluating at the mobile switching center whether the subscriber has pre-selected a combined billing option for the account, where it has been determined that the service has been activated by the subscriber; means for sending a charge transaction from the mobile switching center to a toll payment system, where the motorist has not selected the combined billing option, the charge transaction indicating that the toll has not been paid by the motorist; and means for generating a billing record for the motorist at the mobile switching center and sending a non-charge transaction from the mobile switching center to a toll payment system, where the motorist has selected the combined billing option, the non-charge transaction indicating that the toll has been billed to the motorist via the wireless service provider of the motorist.

An object of the present invention is to provide a fast and convenient process for subscribing to, activating, and paying tolls via wireless communication networks and devices.

Still further advantages and benefits of the present invention will become apparent to those of ordinary skill in the art upon reading and understanding the present specification.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE INVENTION

It is to be understood that the specific methods and systems illustrated in the attached drawings and described in the following specification are simply exemplary embodiments of the inventive concepts defined in the appended claims. Therefore, specific examples and characteristics related to the embodiments disclosed herein are not to be considered as limiting, unless the claims expressly state otherwise.

Figure 1:
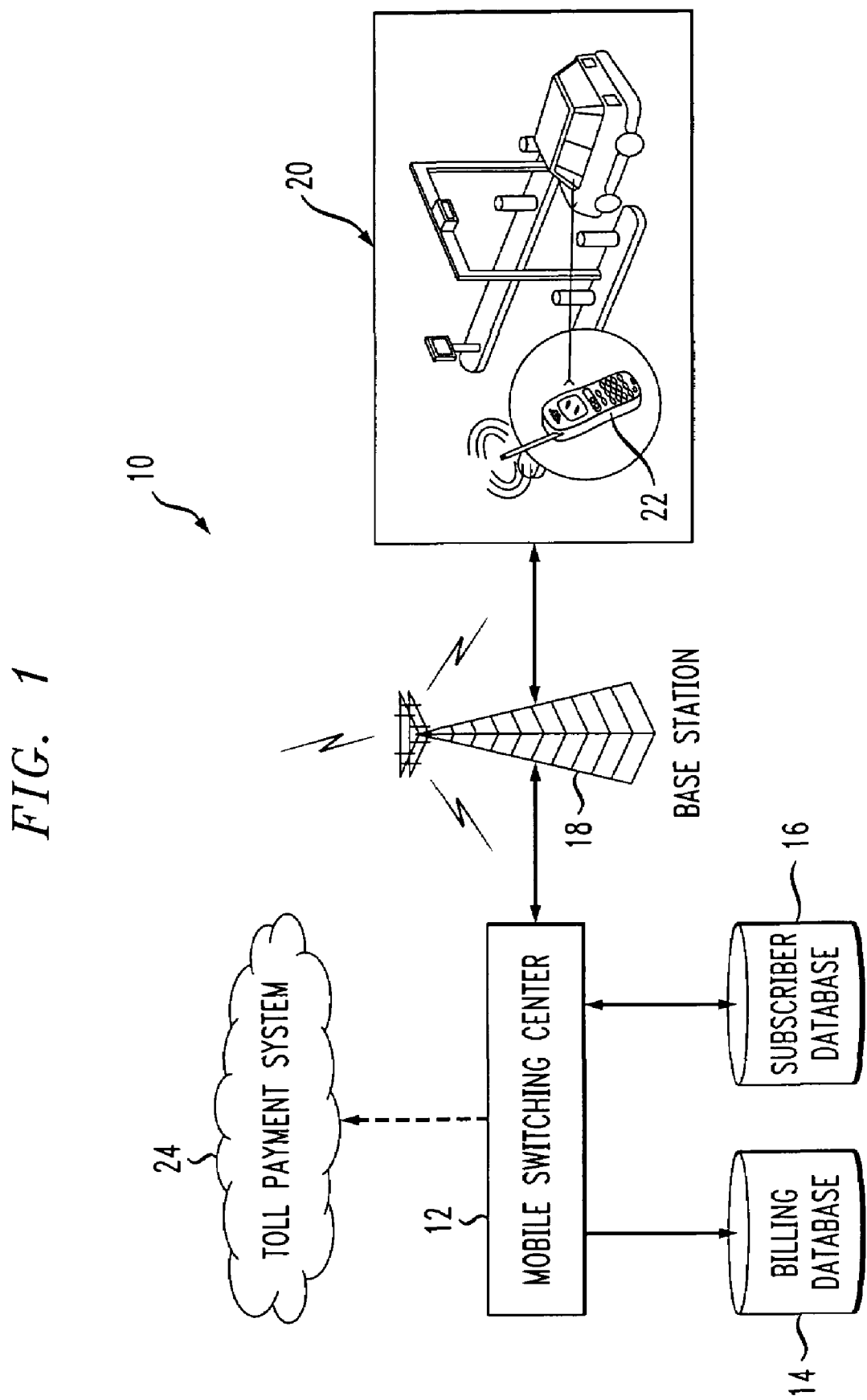
FIG. 1 is a block diagram showing a wireless communication environment suitable for practicing aspects of the present invention.

FIG. 1 is a block diagram of a wireless communication network 10 in which the present invention may be implemented. The network 10 preferably includes one or more of a mobile switching center 12, a billing database 14, a subscriber database 16, a base station 18, a toll plaza 20, a wireless communication device 22, and a toll payment system 24. It is to be understood, however, that the network 10 may incorporate other elements as well.

The base station 18 is generally a central radio transmitter/receiver that maintains communications with the wireless communication devices 22 within a given range (typically a cell site). The base station 18 is coupled to the mobile switching center (MSC) 12, which is generally a switch that provides services and coordination between mobile users in a network and external networks.

The communication device 22 is generally a wireless device that includes a user interface and an interface for coupling to a radio access network (RAN). The user interface of the communication device 22 is typically referred to as terminal equipment and generally includes an audio interface, such as a microphone and speakers, a visual interface, such as a display, and a user input interface, such as a keyboard or touch pad. The interface for coupling to the RAN is typically referred to as a mobile terminal and generally includes an over-the-air interface for transmitting and receiving data. The over-the-air interface of communication device 22 is used to communicate with the base station 18 in the RAN. The communication device 22 and the base station 18 in the RAN may communicate over-the-air using various transmission methods, including a packet-based protocol.

The toll payment system 24 may be a state-wide (such as I-PASS), a regional, or a national system. Although not shown in the figure, the toll payment system 24 may include any number of elements as are known in the art for providing toll payment services to subscribers, including a reading device, subscriber databases, and computer systems for debiting, crediting subscriber accounts based on records created from the transponder reading devices.

In the preferred embodiment, the MSC 12 is a processor-based apparatus with data link interfaces for coupling together as described above and shown in FIG. 1. The MSC 12 includes one or more processors that execute programs to implement the functionality described herein and generally associated with wireless systems. The flexibility of this processor-based system permits ready integration into this system of a wireless toll payment method and system in accordance with the present invention.

Figure 2:
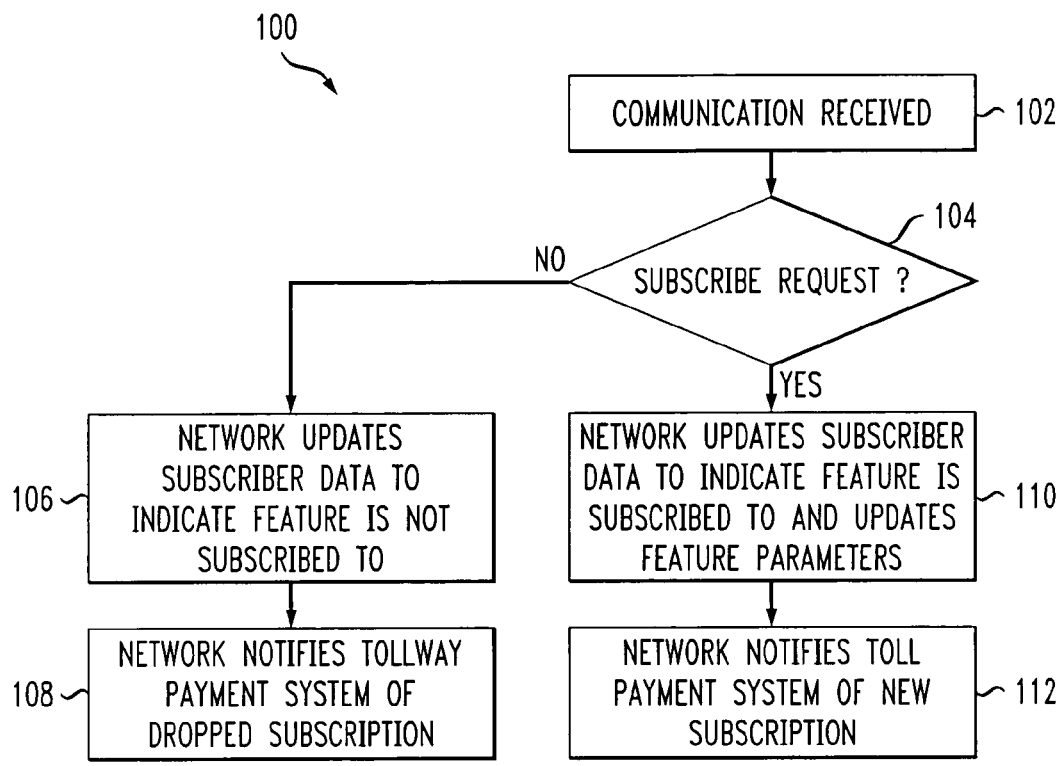
FIG. 2 is a flow chart illustrating a process for handling subscriptions to a wireless toll payment service in accordance with an aspect of the present invention.

With reference now to FIG. 2, a preferred method 100 of subscribing to a wireless toll payment service/feature is shown. It is understood that the method 100 may be implemented through software distributed throughout the network 10, but preferably through software in the MSC 12.

In step 102, a communication/signal is received, preferably at the MSC 12, from the communication device 22 via the base station 18. The communication may be initiated in the usual manner, e.g., by dialing a phone number, by entering a feature activation code (e.g., *77), or through a Web site. The MSC 12 recognizes that the communication is from the base station 18 and then determines whether the communication is a request to subscribe or unsubscribe to a wireless toll payment service (step 104), based upon data contained in the communication. If the request is to unsubscribe to a wireless toll payment service, then the network 10, preferably via the MSC 12, updates the subscriber's data in the subscriber database 16 to reflect that the subscriber in question has unsubscribed to the toll payment service (step 106).

Figure 5:
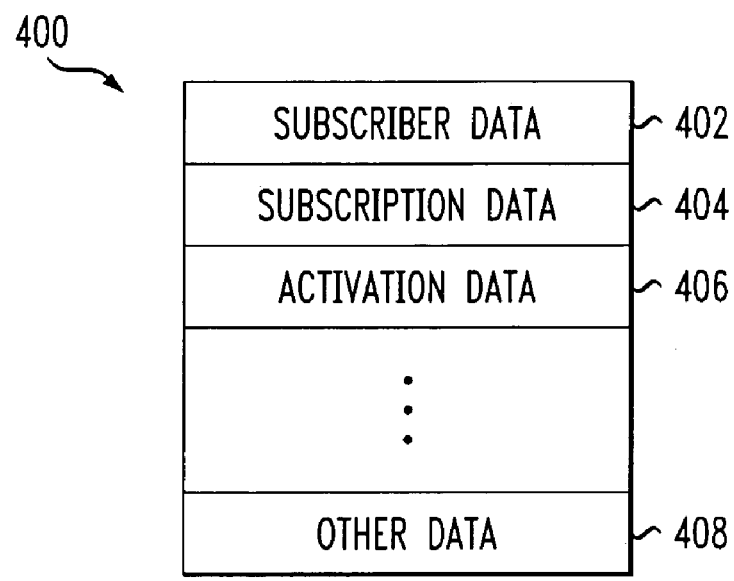
FIG. 5 is memory layout of data stored in the subscriber database in accordance with an aspect of the present invention.

Accordingly, the subscriber database 16 typically includes a number of data sub-blocks for each subscriber. These are shown in FIG. 5. They are shown as a super block 400, not all of whose fields are filled for a particular subscriber. The super block, as known in the art, can be accessed from the identity of any one of several fields in the super block. The super block 400 includes the following data sub-blocks: a block 402 contains basic subscriber data; a block 404 contains toll payment service subscription data; and a block 406 contains toll payment service activation data. Any number of additional blocks 408 may be provided in the super block 400 for storing additional subscriber data.

Returning now to the method 100, in step 108, the MSC 12 then notifies the toll payment system 24 of the dropped subscription. If the communication received is a subscription request, then the MSC 12 updates the subscriber data in the subscriber database 16 to reflect that the service has been subscribed to and updates the feature parameters (step 110). The MSC 12 then notifies the toll payment system 24 of the new subscription (step 112).

Figure 3:
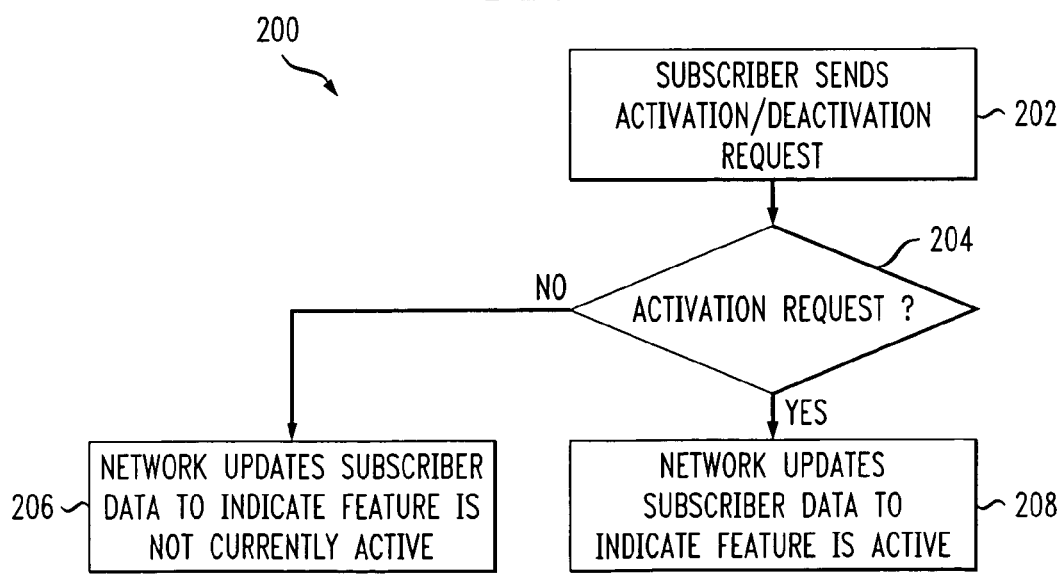
FIG. 3 is a flow chart illustrating a process for handling activation of the wireless toll payment service in accordance with an aspect of the present invention.

With reference now to FIG. 3, a method 200 of handling requests for activation/deactivation of the wireless toll payment service is shown. It is understood that the method 100 may be implemented through software throughout the network 10, but preferably through software in the MSC 12.

In step 202, a wireless subscriber initiates an activation (or deactivation) request of the toll payment service in the usual manner, e.g., by dialing a phone number, by entering a feature activation code, or through a Web site. Next, the MSC 12 receives a communication via the base station 18, and determines whether a service activation/deactivation request has been transmitted, based upon data in the communication (step 204). If a service deactivation request is received, the MSC 12 then updates the subscriber data in the subscriber database 16 to reflect that the service is not currently active (step 206). Otherwise, the MSC 12 updates the subscriber data in the subscriber database 16 to reflect that the service is currently active (step 208).

Figure 4:
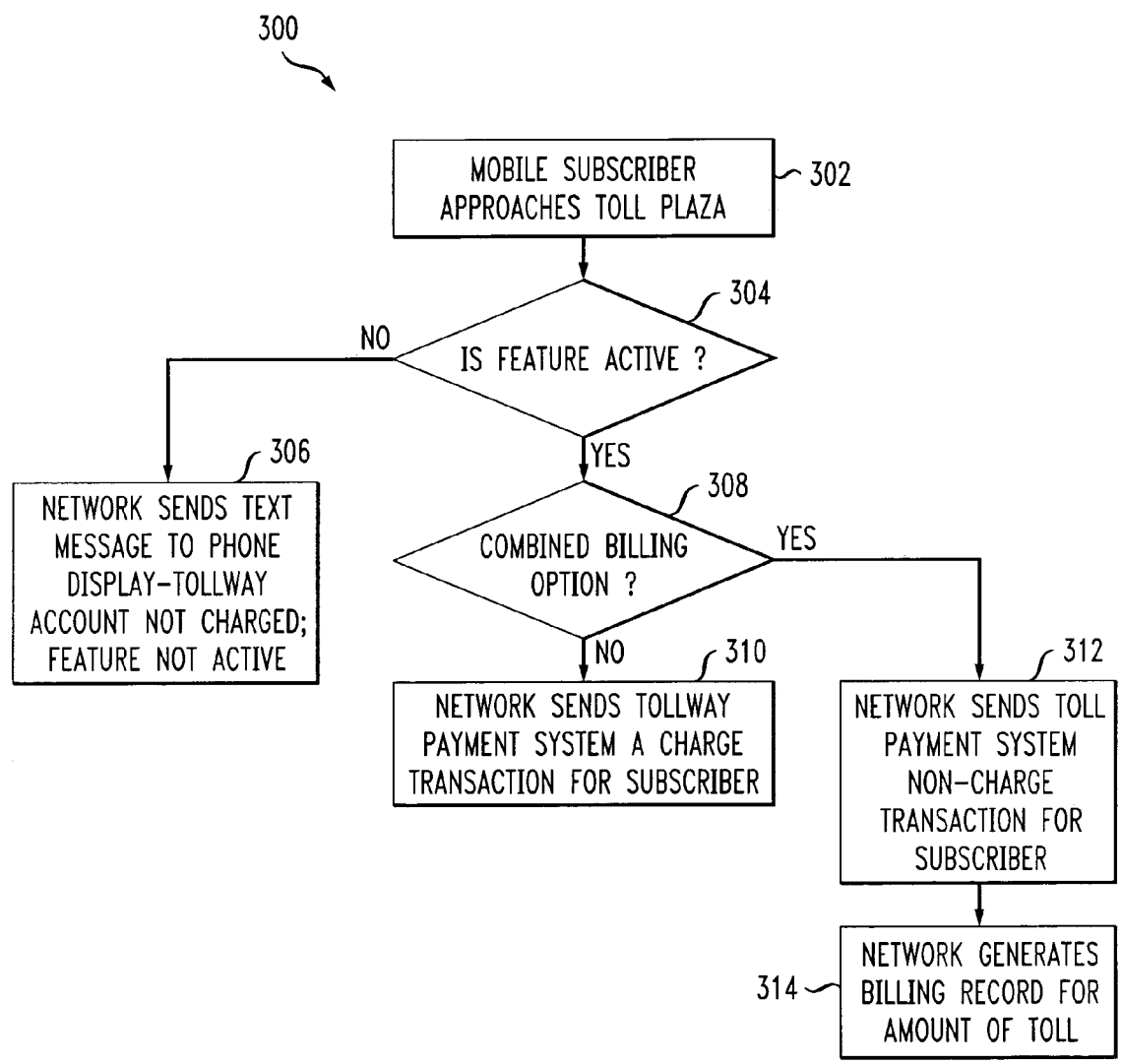
FIG. 4 is a flow chart illustrating a process for implementing the wireless toll payment service in accordance with an aspect of the present invention.

With reference now to FIG. 4, a method 300 of implementing the wireless toll payment service for a particular subscriber is shown. It is understood that the method 100 may be implemented through software throughout the network 10, but preferably through software in the MSC 12.

In step 302, a wireless subscriber approaches the toll plaza 20. The base station 18 will automatically communicate with the communication device 22, if it is turned on. Preferably, the base station 18 is a dedicated base station. That is, the base station 18 has a small RF footprint.

The communication is then transmitted from the base station 18 to the MSC 12, and a determination is made by the MSC 12 as to whether the service is active for the subscriber (step 304). If not, the MSC 12 may send a text message to the subscriber's communication device 22, indicating, for example, that the service is not active and that the wireless toll payment account has not been charged (step 306). Otherwise, the MSC 12 determines whether the subscriber has selected a combined billing option as stored in the subscriber database 16 (step 308).

The subscriber may select a combined billing option when signing up for the wireless toll payment service. That is, the subscriber may choose to have all toll charges processed by the wireless service provider, which charges would then show up on the subscriber's wireless bill. In that situation, the wireless service provider would send payment directly to the toll payment system on behalf of the subscriber, according to a pre-arranged agreement between the wireless service provider and the toll payment system.

If the subscriber has not selected the combined billing option, then the MSC 12 sends the toll payment system 24 a charge transaction for the subscriber (step 310). However, if the subscriber has selected the combined billing option, then the MSC 12 sends the toll payment system 24 a non-charge transaction for the subscriber (step 312). The network 10 then generates a mobile billing record for the amount of the toll charge and stores it in the billing database 14 (step 314).

Figure 6:
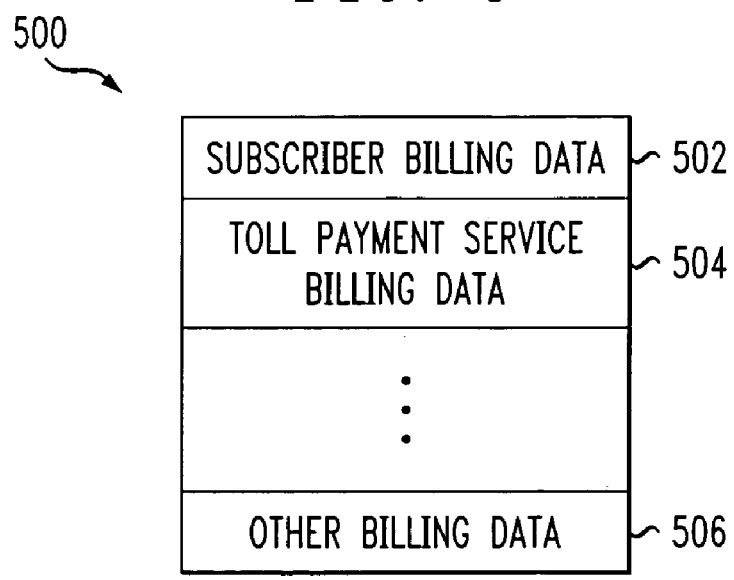
FIG. 6 is memory layout of data stored in the billing database in accordance with an aspect of the present invention.

The billing database 14 includes a number of data sub-blocks for each subscriber. These are shown in FIG. 6. They are shown as a super block 500 not all of whose fields are filled for a particular subscriber. The super block, as known in the art, can be accessed from the identity of any one of several fields in the super block. The super block 500 includes a data sub-block 502, which contains basic subscriber billing data and a data sub-block 504, which contains toll payment service billing data. Any number of sub-blocks 506 may be provided in the super block 500 for storing additional subscriber billing data.

Thus, in accordance with the present invention, a subscriber may simply (1) make a call to a wireless service provider to subscribe to a wireless toll payment service via a mobile phone, (2) activate the wireless toll payment service with the mobile phone, and (3) drive through a properly equipped toll collection plaza with their mobile phone turned on. The toll collection plaza would then recognize that the mobile device approaching the plaza is associated with a subscriber to the wireless toll payment service who has activated such service. In turn, data concerning the transaction would be sent to the toll payment system, and the subscriber's account would be properly billed.

Alternatively, a user may be able to purchase or lease a wireless communication device that has been adapted to work with the wireless toll payment service, as described above. Such a modified device would include a transponder, similar to the one available through I-PASS, built into it. The device, when it is turned on and the subscriber's account is suitably credited, may be able to communicate with the toll plaza, in order to process payment for the toll.

The invention has been described with reference to the preferred embodiments. Obviously, modifications and alterations will occur to others upon reading and understanding the preceding detailed description of the preferred embodiments. It is intended that the invention be construed as including all such modifications and alterations insofar as they come within the scope of the appended claims or the equivalence thereof.

What is claimed is:

1. In a wireless communication network, a method of processing toll payments for a motorist having a wireless communications device and a billing account with a wireless service provider, the method comprising:

sensing that the motorist is within range of a base station for a toll plaza having a given toll that is to be paid by the motorist;

determining via a mobile switching center whether the motorist has activated a wireless toll payment service associated with the communication device;

evaluating via the mobile switching center whether the subscriber has pre-selected a combined billing option for the account, where it has been determined that the service has been activated by the subscriber;

sending a charge transaction from the mobile switching center to a toll payment system, where the motorist has not selected the combined billing option, the charge transaction indicating that the toll has not been paid by the motorist; and generating a billing record for the motorist at the mobile switching center and sending a non-charge transaction from the mobile switching center to a toll payment system, where the motorist has selected the combined billing option, the non-charge transaction indicating that the toll has been billed to the motorist by the wireless service provider.

2. The method defined in claim 1, further comprising:

receiving at the mobile switching center a communication from the subscriber via the communication device;

determining at the mobile switching center a subscriber subscription status based upon the communication;

updating via the mobile switching center a subscriber database to indicate the subscriber subscription status; and notifying the toll payment system of the subscriber subscription status.

3. The method defined in claim 2, wherein the communication is a subscribe or unsubscribe request and is initiated by dialing a phone number, entering a feature activation code or logging onto a Web site.

4. The method defined in claim 1, further comprising:

receiving at the mobile switching center a service activation request from the subscriber via the communication device; and updating a subscriber database to indicate that the wireless toll payment service has been activated for the subscriber.

5. The method defined in claim 2 further comprising:

receiving at the mobile switching center a service activation request from the subscriber via the communication device; and updating the subscriber database to indicate that the wireless toll payment service has been activated for the subscriber.

6. The method defined in claim 5, wherein the service activation request is initiated by dialing a phone number, entering a feature activation code or logging onto a Web site.

7. A system for processing toll payments for a motorist having a wireless communication device and a wireless billing account with a wireless service provider, the system comprising:
- means for sensing that the motorist having a communication device is within range of a base station for a toll plaza having a given toll that is to be paid by the motorist;
- means for determining at a mobile switching center whether the motorist has activated a wireless toll payment service associated with the communication device;
- means for evaluating at the mobile switching center whether the subscriber has pre-selected a combined billing option for the account, where it has been determined that the service has been activated by the subscriber;
- means for sending a charge transaction from the mobile switching center to a toll payment system, where the motorist has not selected the combined billing option, the charge transaction indicating that the toll has not been paid by the motorist; and
- means for generating a billing record for the motorist at the mobile switching center and sending a non-charge transaction from the mobile switching center to a toll payment system, where the motorist has selected the combined billing option, the non-charge transaction indicating that the toll has been billed to the motorist by the wireless service provider.

8. The system defined in claim 7, further comprising:
- means for receiving at the mobile switching center a communication from the subscriber via the communication device;
- means for determining at the mobile switching center a subscriber subscription status based upon the communication;
- means for updating via the mobile switching center a subscriber database to indicate the subscriber subscription status; and
- means for notifying the toll payment system of the subscriber subscription status.

9. The system defined in claim 8, further comprising:
- means for receiving at the mobile switching center a service activation request from the subscriber via the communication device; and
- means for updating a subscriber database to indicate that the wireless toll payment service has been activated for the subscriber.

10. The system defined in claim 8, further comprising:
- means for receiving at the mobile switching center a service activation request from the subscriber via the communication device; and
- means for updating the subscriber database to indicate that the wireless toll payment service has been activated for the subscriber.

* * * * *